(12) United States Patent
O'Connor et al.

(10) Patent No.: US 11,874,748 B2
(45) Date of Patent: Jan. 16, 2024

(54) STORAGE HOST RETIREMENT AND ROLLBACK

(71) Applicant: Dell Products L.P., Hopkinton, MA (US)

(72) Inventors: Timothy O'Connor, Farnanes (IE); Finbarr O'Riordan, Ballinlough (IE)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/714,211

(22) Filed: Apr. 6, 2022

(65) Prior Publication Data
US 2023/0325285 A1  Oct. 12, 2023

(51) Int. Cl.
*G06F 16/23* (2019.01)
*G06F 11/14* (2006.01)

(52) U.S. Cl.
CPC ...... *G06F 11/1469* (2013.01); *G06F 11/1448* (2013.01); *G06F 2201/84* (2013.01)

(58) Field of Classification Search
CPC .. G06F 2201/84; G06F 3/065; G06F 16/2365; G06F 16/27; G06F 11/1469; G06F 11/1448
See application file for complete search history.

(56) References Cited

U.S. PATENT DOCUMENTS

| | | | |
|---|---|---|---|
| 2017/0185323 A1* | 6/2017 | Kaushik | G06F 11/1471 |
| 2021/0303164 A1* | 9/2021 | Grunwald | G06F 3/0629 |
| 2022/0027051 A1* | 1/2022 | Kant | G06F 3/0605 |

* cited by examiner

*Primary Examiner* — Apu M Mofiz
*Assistant Examiner* — Cindy Nguyen
(74) *Attorney, Agent, or Firm* — Anderson Gorecki LLP (57) ABSTRACT

Rollback snapshots are created by a storage system when host servers are retired. The rollback snapshots include a masking views and information about the storage objects associated with the host servers. Retired host servers can be recovered by using the rollback snapshots to reconstruct masking views and recreate storage objects.

8 Claims, 6 Drawing Sheets

STORAGE HOST RETIREMENT AND ROLLBACK

TECHNICAL FIELD

The subject matter of this disclosure is generally related to storage host retirement.

BACKGROUND

Data centers include host servers and high-capacity data storage systems such as storage area networks (SANs), network-attached storage (NAS), and storage arrays. The storage systems respond to input-output (IO) commands from instances of host applications that run on the host servers. Examples of host applications may include, but are not limited to, software for email, accounting, manufacturing, inventory control, and a wide variety of other business processes. Host servers eventually need to be removed from service, repurposed to run instances of a different host application, or otherwise retired from current service. An administrator identifies the host servers that are eligible for retirement and then frees the associated memory and storage resources used to maintain metadata and data for the host servers. The procedure is time-consuming and error-prone, particularly in a data center that may include hundreds of storage systems and thousands of host servers.

SUMMARY

A method in accordance with some implementations comprises: generating a rollback snapshot of associations between storage objects maintained by a storage system and at least one host server that is designated for retirement; and following retirement of the host server, using the rollback snapshot to recover the host server by recreating the associations between the host server and the storage objects.

A non-transitory computer-readable storage medium stores instructions that when executed by a computer perform a method in accordance with some implementations comprising: generating a rollback snapshot of associations between storage objects maintained by a storage system and at least one host server that is designated for retirement; and following retirement of the host server, using the rollback snapshot to recover the host server by recreating the associations between the host server and the storage objects.

An apparatus in accordance with some implementations comprises: a storage system with plurality of compute nodes than manage access to an array of non-volatile drives on which data of a replicated storage object is stored, at least one of the compute nodes configured to generate a rollback snapshot of associations between storage objects maintained by the storage system and at least one host server that is designated for retirement and, following retirement of the host server, use the rollback snapshot to recover the host server by recreating the associations between the host server and the storage objects.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
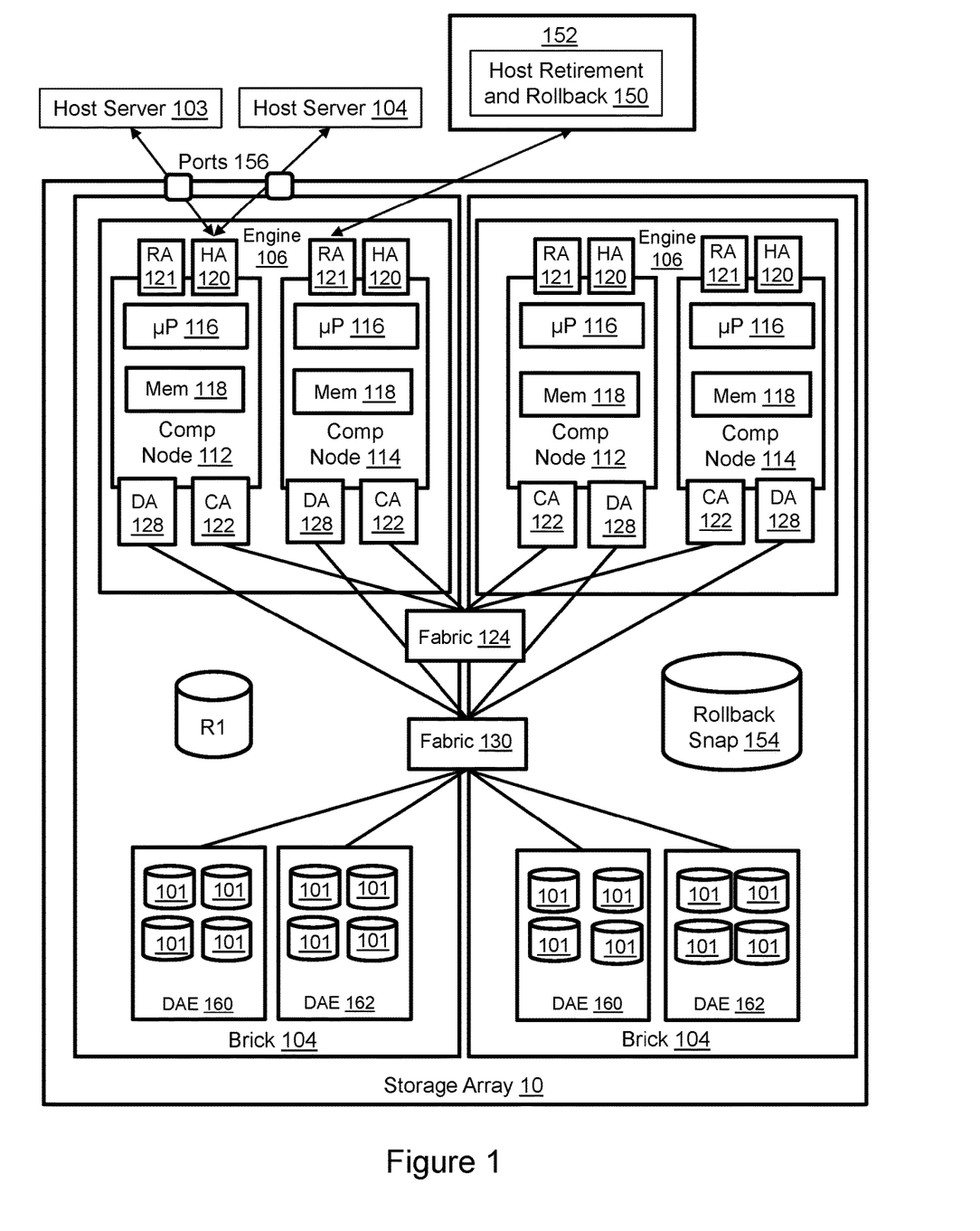
FIG. 1 illustrates a simplified data center in which a host retirement and rollback program running on a management station creates a rollback snapshot that enables host server retirements to be reversed.

FIG. 1 illustrates a simplified data center in which a host retirement and rollback program 150 running on a management station 152 creates a rollback snapshot 154 that enable host server retirements to be reversed. The illustrated data center includes a storage array 10 and a cluster of two host servers 103, 104 that run host application instances, but the data center would typically include more than two host servers and more than one storage array. The host servers include volatile memory, non-volatile storage, and one or more tangible processors that support instances of a host application, as is known in the art. The storage array 10 includes one or more bricks 104. Each brick 104 includes an engine 106 and one or more disk array enclosures (DAEs) 160, 162. In the illustrated example there are only two engines, but the storage array could include a greater or lesser number of engines. Each engine 106 includes two interconnected compute nodes 112, 114 that are arranged as a pair for failover and may be referred to as "storage directors." Although it is known in the art to refer to the compute nodes of a SAN as "hosts," that naming convention is avoided in this disclosure to help distinguish the network server hosts 103, 104 from the compute nodes 112, 114. Nevertheless, the host applications could run on the compute nodes, e.g., on virtual machines or in containers. Each compute node is implemented as a separate printed circuit board (PCB) or blade and includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by all compute nodes of the storage array using direct memory access (DMA). Each compute node includes one or more host adapters (HAs) 120 for communicating with the host servers 103, 104. Each host adapter has memory resources for servicing input-output commands (IOs) from the host servers. The host adapter resources may include processors, volatile memory, and associated ports 156 via which the hosts may access the storage array. Each compute node also includes a remote adapter (RA) 121 for communicating with other storage systems, e.g., for storage object replication. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations, every disk adapter 128 in the storage array can reach every DAE via the fabric 130. Further, in some implementations every disk adapter in the storage array can access every managed disk 101.

Figure 2:
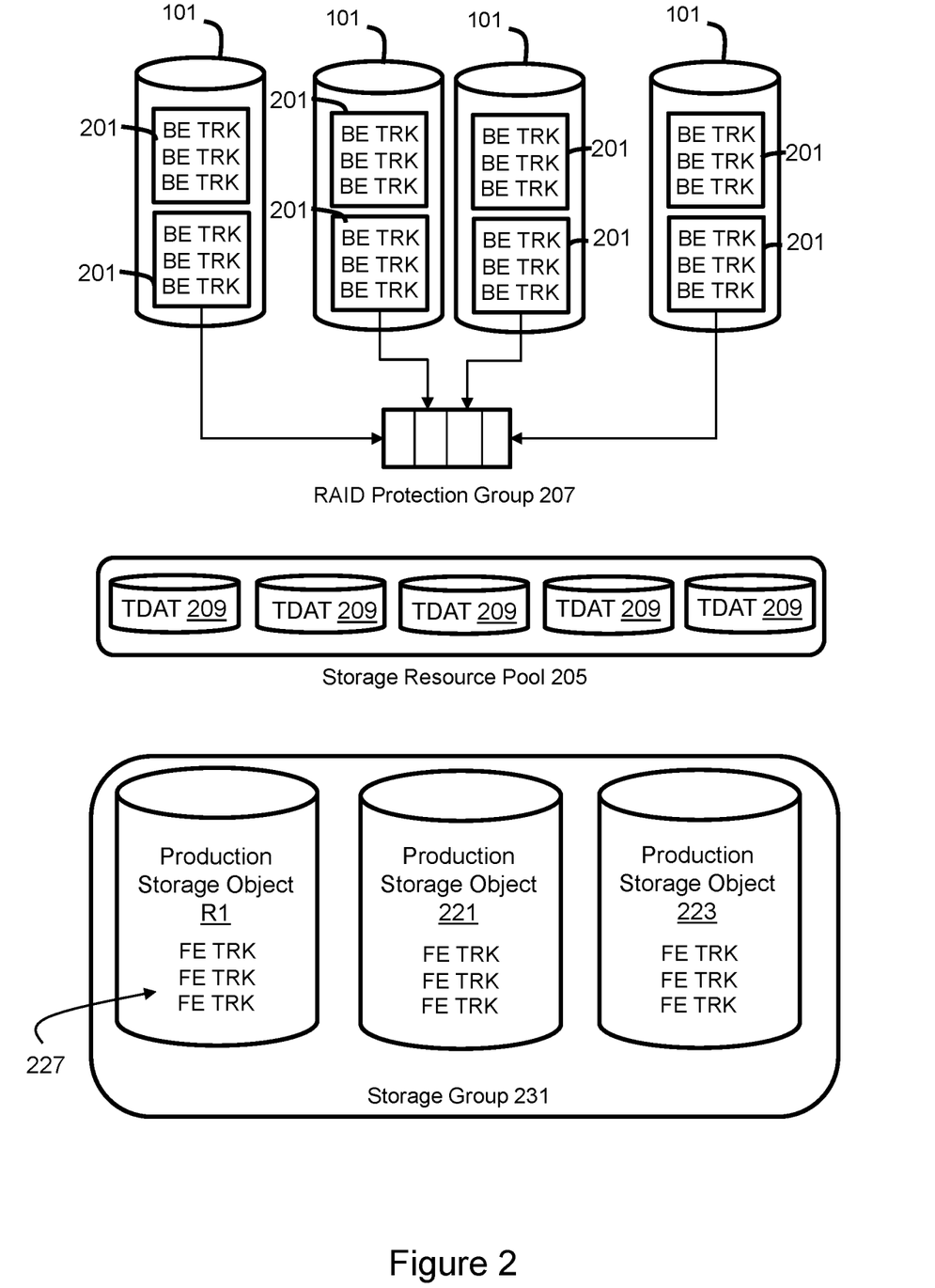
FIG. 2 illustrates aspects of storage abstraction in greater detail.

Referring to FIGS. 1 and 2, host application data that is logically stored on a local storage object replica R1 is physically stored on the managed drives 101. The managed drives are not discoverable by the host servers 103, 104 but the storage object replica R1 can be discovered by the host servers. Without limitation, storage objects may be referred to as devices, volumes, or LUNs, where a logical unit number (LUN) is a number used to identify logical storage volumes in accordance with the small computer system interface (SCSI) protocol. Storage objects that can be discovered and accessed by the host servers are identified by the term "production," e.g., a production volume, production device, or production LUN. From the perspective of the host servers 103, 104, each production storage object is a single disk having a set of contiguous logical block addresses (LBAs) on which data used by the instances of a host application resides. However, the host application data is stored at non-contiguous addresses on various managed drives 101. A storage group 231 containing multiple production storage objects, including replica R1, storage object 221 (which may also be replicated), and storage object 223 (which may also be replicated), may be created for the instances of an individual host application. Multiple instances of a single host application may use data from the same storage group, but instances of different host applications generally do not use data from the same storage group. The storage array may maintain a large number of production storage objects and storage groups.

The compute nodes 112, 114 maintain metadata that maps between the LBAs of the production storage objects (replica R1, 221, 223) and physical addresses on the managed drives 101 in order to process IOs from the host servers 103, 104. The basic allocation unit of storage capacity that is used by the compute nodes 112, 114 to access the managed drives 101 is a back-end track (BE TRK). The managed drives may be configured with partitions or splits 201, each of which may contain multiple BE TRKs. A group of partitions or splits from different managed drives is used to create a RAID protection group 207. A storage resource pool 205 is a grouping of storage objects known as thin data devices (TDATs) 209 that contain RAID protection groups 207 of the same type, e.g., RAID-5 (3+1). Storage resource pools are used to create the production storage objects (replica R1, 221, 223). The host application data is logically stored in front-end tracks (FE TRKs) on the production storage objects. The FE TRKs are mapped to the BE TRKs and vice versa by FE TRK IDs and BE TRK IDs, which are pointers that are maintained in the shared memory.

Figure 3:
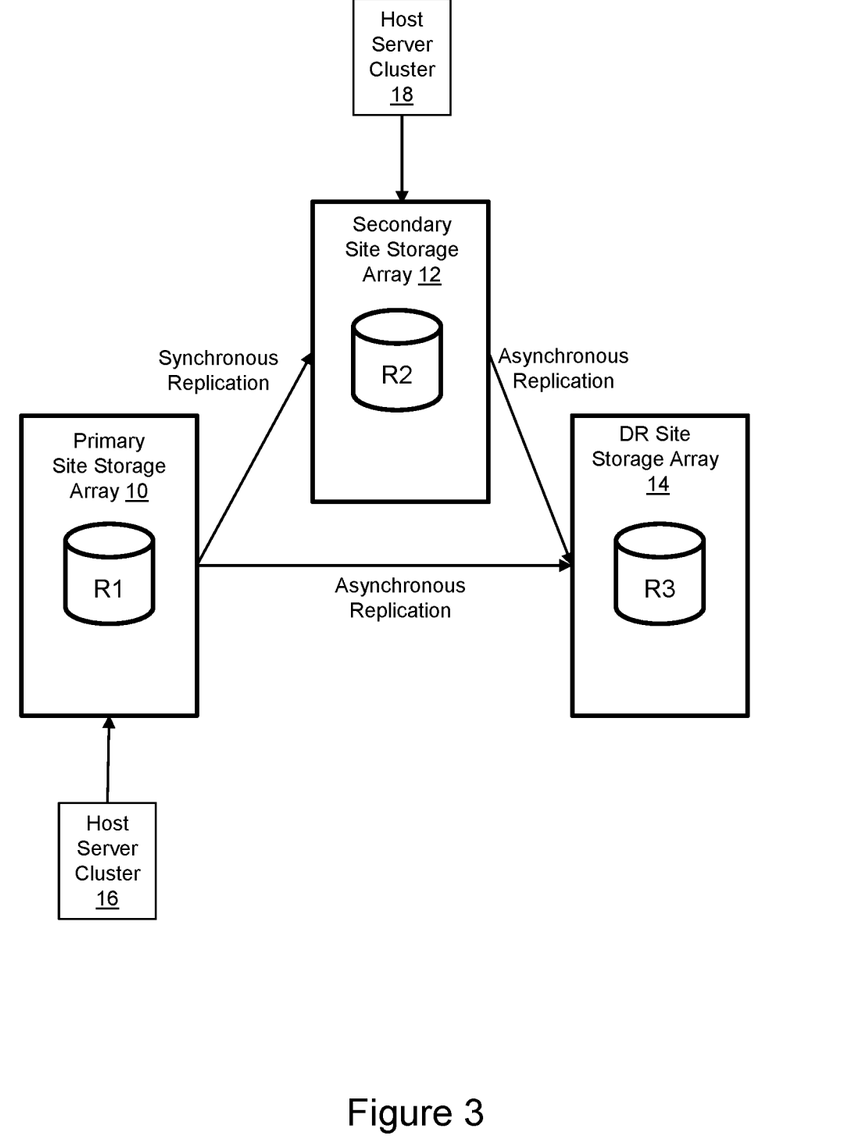
FIG. 3 illustrates storage object replication.

FIG. 3 illustrates storage object replication. The illustrated example includes the primary site storage array 10, a secondary site storage array 12, and a disaster recovery site storage array 14. The first (local) replica R1 of a storage object is maintained on the primary site storage array. A second (remote) replica R2 of the storage object is maintained on the secondary site storage array. A third (remote, archive) replica R3 of the storage object is maintained on the disaster recovery site storage array. The first replica R1 may be a production storage object that is actively accessed by a host server cluster on which host application instances run. The second replica R2 may be a production or failover storage object that is actively accessed or ready to be actively accessed by a host server cluster on which host application instances run. The third replica R3 may be maintained for disaster recovery. Replica R1 and replica R2 are updated synchronously, whereas replica R3 is updated asynchronously. The secondary site storage array could be active or passive while the primary site storage array is active.

Figure 4:
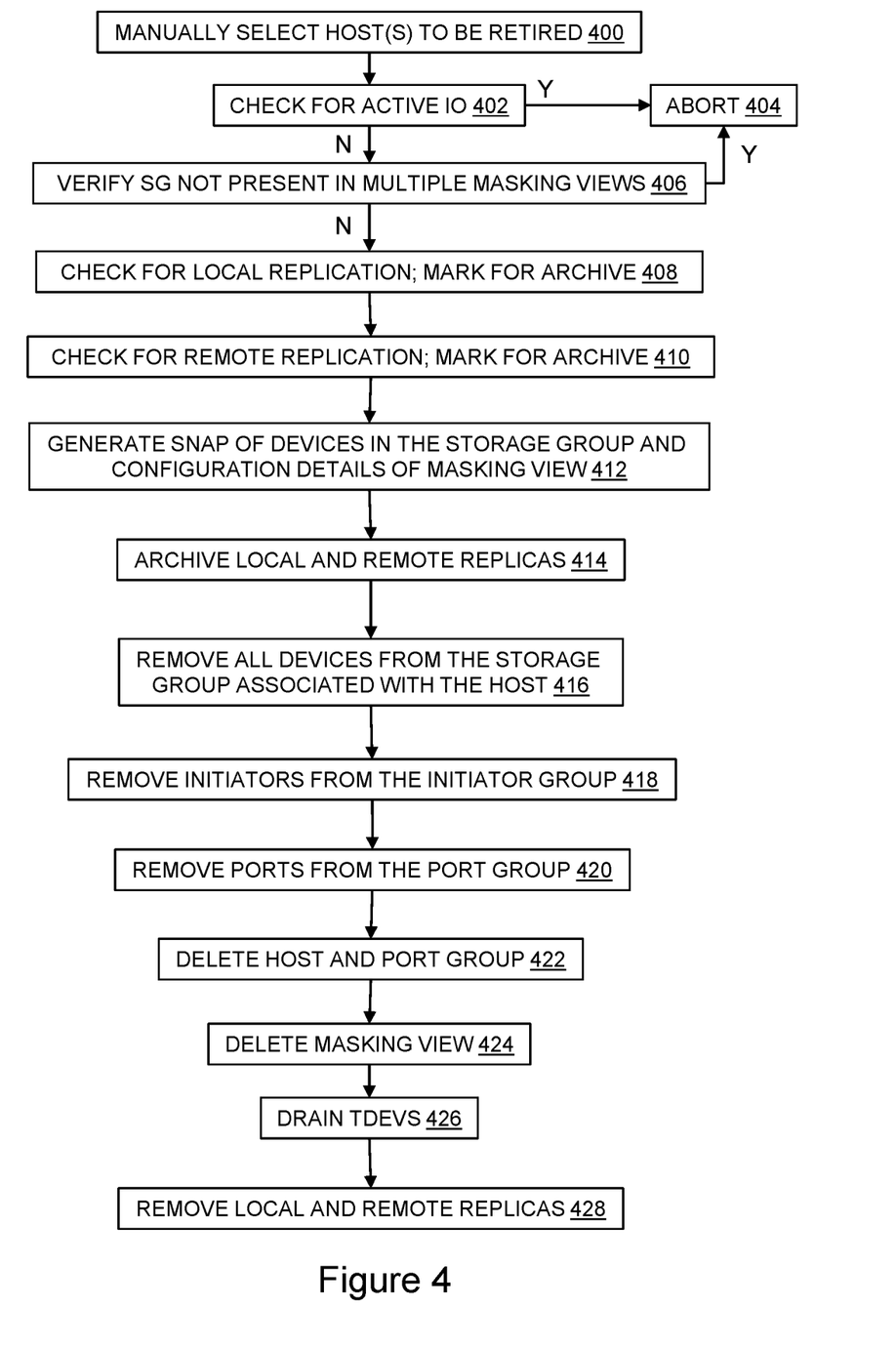
FIG. 4 illustrates manually-initiated host server retirement.

FIG. 4 illustrates manually-initiated host retirement. An administrator manually identifies and selects one or more host servers to be retired and provides the host IDs, e.g., worldwide names (WWNs) as input to the host retirement and rollback program as indicated in step 400. The host retirement and rollback program then checks for active IOs from the identified host server as indicated in step 402. For example, the program may monitor for IOs from the host server for a predetermined period of time before reaching a determination that the host server is not generating IOs. If active IOs from the host server are detected, then the retirement of the host server is aborted as indicated in step 404. If active IOs from the host server are not detected, then the program verifies that the associated storage group is not present in multiple masking views as indicated in step 406. A masking view includes an initiator group, a port group, and a storage group. The initiator group includes the WWNs of the hosts associated with the storage group. The port group indicates the front-end ports via which the host servers are connected to the storage array. The storage group includes the identities of the associated storage objects. If the storage group is present in multiple masking views, then retirement of the host server is aborted as indicated in step 404. If the storage group is not present in multiple masking views, then the program checks for the existence of local replication and, if exists, marks the local replica for archive as indicated in step 408. As indicated in step 410, the program also checks for the existence of remote replication and, if it exists, marks the remote replica for archive. The program then prompts generation of a rollback snapshot of the storage objects in the storage group and the configuration details of the masking view as indicated in step 412. As will be explained below, the rollback snapshot enables retirement of the host server to be reversed. The local and remote replicas that were previously marked for archive are archived as indicated in step 414. All storage objects are then removed from the storage group associated with the host server as indicated in step 416. The initiators are removed from the initiator group of the masking view as indicated in step 418. The ports are removed from the port group of the masking view as indicated in step 420. The host and port groups are then removed as indicated in step 422. The masking view can then be deleted as indicated in step 424. The TDEVs associated with the storage objects of the storage group are drained by marking the previously utilized addresses as free space as indicated in step 426. Eventually, e.g., after some predetermined period of time, the local and remote replicas can be removed as indicated in step 428.

Figure 5:
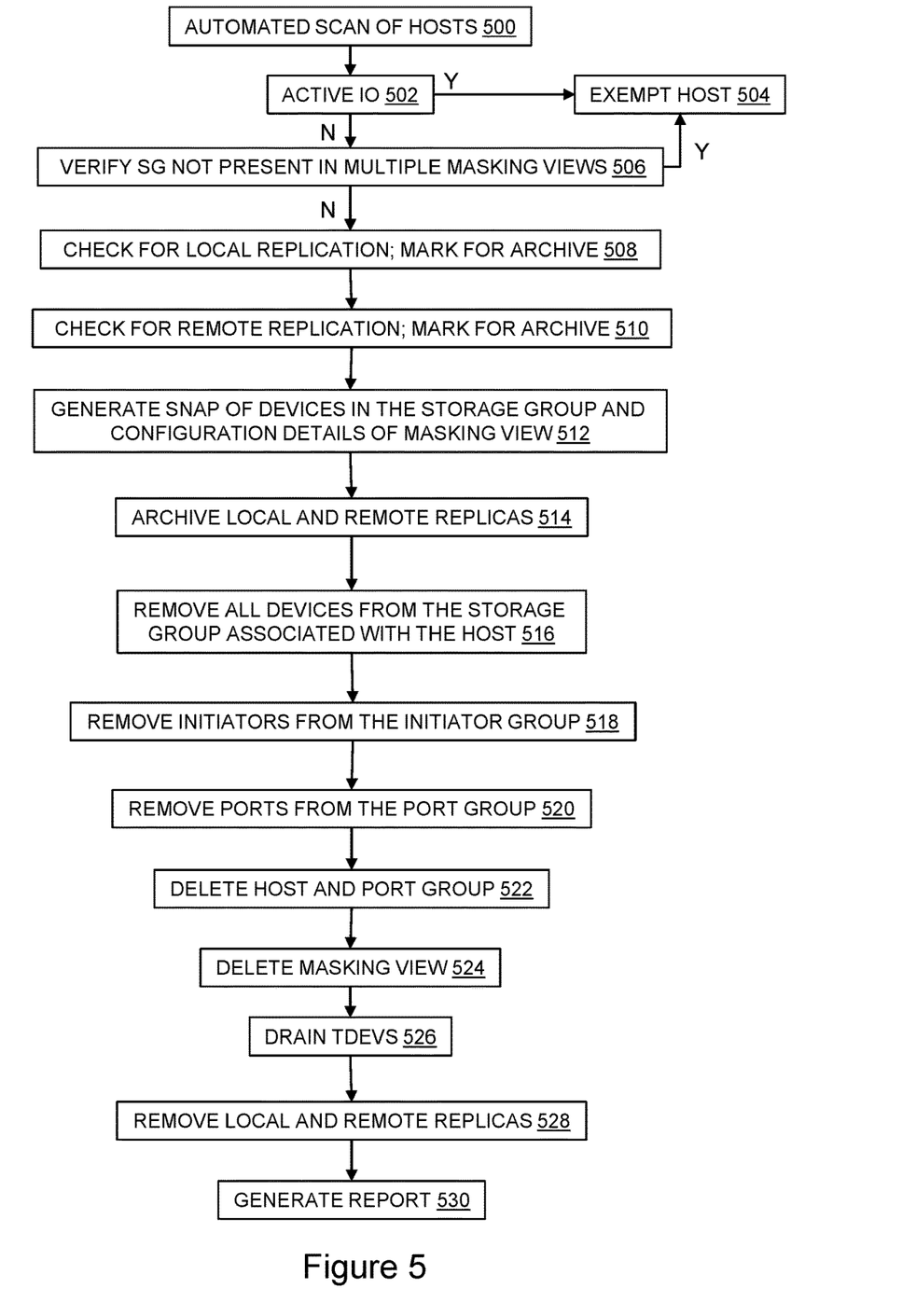
FIG. 5 illustrates auto-initiated host server retirement.

FIG. 5 illustrates auto-initiated host retirement. The host retirement and rollback program performs periodic, automated scans of the host servers as indicated in step 500. Hosts that are actively generating IOs, as determined in step 502, are deemed ineligible and exempted from retirement as indicated in step 504. For hosts that are not actively generating IOs, as determined in step 502, the program verifies that the associated storage group is not present in multiple masking views as indicated in step 506. If the storage group is present in multiple masking views, then the host is exempted from retirement as indicated in step 504. If the storage group is not present in multiple masking views, then the program checks for the existence of local replication and, if it exists, marks the local replica for archive as indicated in step 508. As indicated in step 510, the program also checks for the existence of remote replication and, if it exists, marks the remote replica for archive. The program then prompts generation of a rollback snapshot of the storage objects in the storage group and the configuration details of the masking view as indicated in step 512. The local and remote replicas that were previously marked for archive are archived as indicated in step 514. All storage objects are then removed from the storage group associated with the host as indicated in step 516. The initiators are removed from the initiator group of the masking view as indicated in step 518. The ports are removed from the port group of the masking view as indicated in step 520. The host and port groups are then removed as indicated in step 522. The masking view can then be deleted as indicated in step 524. The TDEVs associated with the storage objects of the storage group are drained by marking the previously utilized addresses as free space as indicated in step 526. Eventually, the local and remote replicas can be removed as indicated in step 528. The program generates a report as indicated in step 530 with a summary of which hosts were retired and associated storage that was reclaimed.

Figure 6:
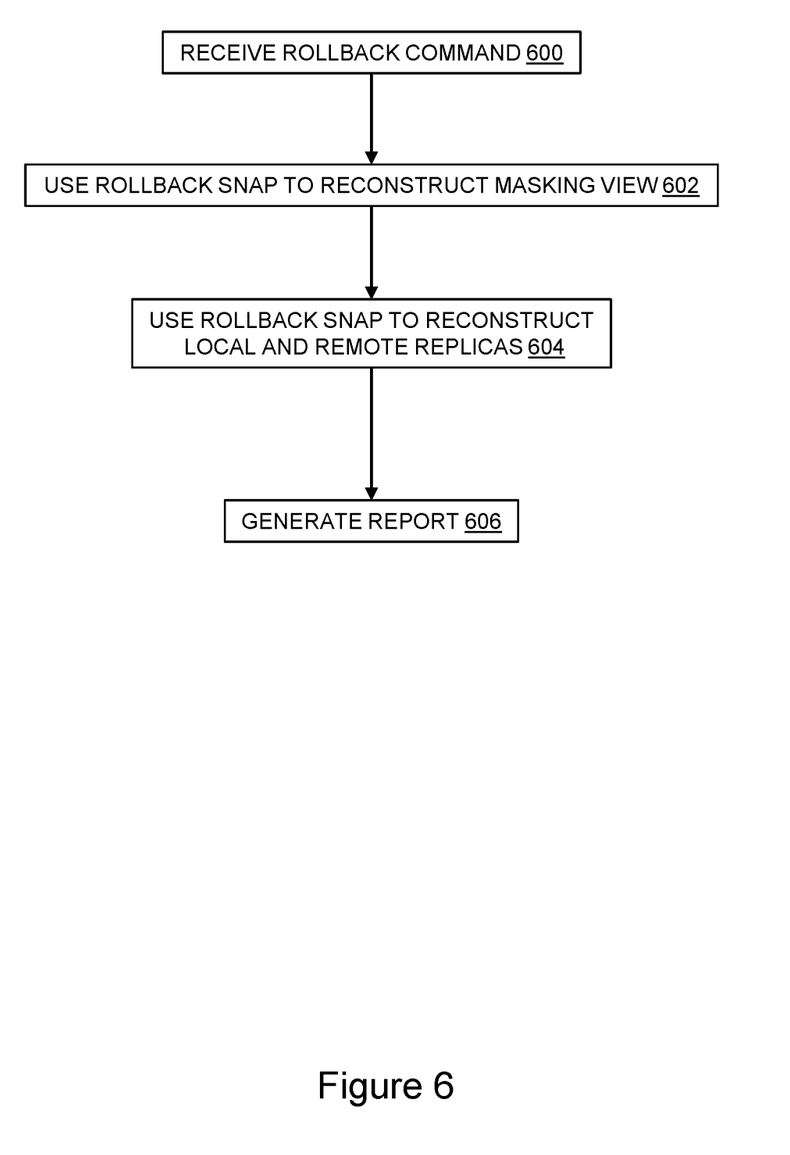
FIG. 6 illustrates host server retirement rollback.

FIG. 6 illustrates rollback of a host server retirement. In step 600, the host retirement and rollback program receives a command from an administrator to recover a retired host server. The host server may be identified by the WWN. The rollback snapshot is accessed and used to reconstruct the masking view as indicated in step 602. Initiator, port, and storage groups are recreated and populated with the WWN of the host, port IDs, and storage group information. The rollback snapshot is used to reconstruct the local and remote replicas as indicated in step 604. This may include recreating the TDATs, storage resource pool, and production storage objects, and copying archived data to the managed drives. Step 606 is generating a report with details of storage restored and an audit trail of all actions.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
maintaining a plurality of storage objects in a storage system, each of the storage objects containing data for only one host application of a plurality of host applications that run on a plurality of external host servers that are data access initiators relative to the storage system, all data for each host application being maintained on storage objects of a storage group that is uniquely associated with that host application, the storage system having a plurality of ports, not all of which are accessible by all the host servers, different groups of the ports being accessible to different ones of the host servers, and different ones of the storage groups being accessible to different ones of the host servers;
generating a rollback snapshot of associations between ones of the storage objects maintained by the storage system and at least one host server that is designated for retirement including generating a representation of a masking view that indicates membership of the retirement-designated host server in an initiator group with the world-wide name of the retirement-designated host server, a port group that indicates ones of the ports that the retirement-designated host server can access, and a storage group containing storage objects that the retirement-designated host server is permitted to access; and
following retirement of the retirement-designated host server, using the rollback snapshot to recover the retired host server by recreating the associations between the retirement-designated host server and the storage objects, comprising:
reconstructing the masking view that indicates membership of the retirement-designated host server in an initiator group with the world-wide name of the retirement-designated host server;
reconstructing the port group that indicates ones of the ports that the retirement-designated host server can access; and
reconstructing the storage group that the retirement-designated host server is permitted to access.

2. The method of claim 1 further comprising reconstructing a local replica of at least one of the storage objects.

3. The method of claim 1 further comprising reconstructing a remote replica of at least one of the storage objects.

4. A non-transitory computer-readable storage medium storing instructions that when executed by a computer perform a method comprising:
   maintaining a plurality of storage objects in a storage system, each of the storage objects containing data for only one host application of a plurality of host applications that run on a plurality of external host servers that are data access initiators relative to the storage system, all data for each host application being maintained on storage objects of a storage group that is uniquely associated with that host application, the storage system having a plurality of ports, not all of which are accessible by all the host servers, different groups of the ports being accessible to different ones of the host servers, and different ones of the storage groups being accessible to different ones of the host servers;
   generating a rollback snapshot of associations between ones of the storage objects maintained by the storage system and at least one host server that is designated for retirement, including generating a representation of a masking view that indicates membership of the retirement-designated host server in an initiator group with the world-wide name of the retirement-designated host server, a port group that indicates ones of the ports that the retirement-designated host server can access, and a storage group containing storage objects that the retirement-designated host server is permitted to access; and
   following retirement of the retirement-designated host server, using the rollback snapshot to recover the retired host server by recreating the associations between the retirement-designated host server and the storage objects, comprising:
      reconstructing the masking view that indicates membership of the retirement-designated host server in an initiator group with the world-wide name of the retirement-designated host server;
      reconstructing the port group that indicates ones of the ports that the retirement-designated host server can access; and
   reconstructing the storage group that the retirement-designated host server is permitted to access.

5. The non-transitory computer-readable storage medium of claim 4 in which the method further comprises reconstructing a local replica of at least one of the storage objects.

6. The non-transitory computer-readable storage medium of claim 4 in which the method further comprises reconstructing a remote replica of at least one of the storage objects.

7. An apparatus comprising:
   a storage system with plurality of compute nodes than manage access to an array of non-volatile drives on which data of a replicated storage object is stored, the storage system configured to maintain a plurality of storage objects, each of the storage objects containing data for only one host application of a plurality of host applications that run on a plurality of external host servers that are data access initiators relative to the storage system, all data for each host application being maintained on storage objects of a storage group that is uniquely associated with that host application, the storage system having a plurality of ports, not all of which are accessible by all the host servers, different groups of the ports being accessible to different ones of the host servers, and different ones of the storage groups being accessible to different ones of the host servers;
   at least one of the compute nodes configured to generate a rollback snapshot of associations between ones of the storage objects maintained by the storage system and at least one host server that is designated for retirement, including generating a representation of a masking view that indicates membership of the retirement-designated host server in an initiator group with the world-wide name of the retirement-designated host server, a port group that indicates ones of the ports that the retirement-designated host server can access, and a storage group containing storage objects that the retirement-designated host server is permitted to access and, following retirement of the retirement-designated host server, use the rollback snapshot to recover the retired host server by recreating the associations between the retirement-designated host server and the storage objects, comprising:
      reconstruction of the masking view that indicates membership of the retirement-designated host server in an initiator group with the world-wide name of the retirement-designated host server;
      reconstruction of the port group that indicates ones of the ports that the retirement-designated host server can access; and
      reconstruction of the storage group that the retirement-designated host server is permitted to access.

8. The apparatus of claim 7 in which the compute node is further configured to recreate a local replica of at least one of the storage objects.

* * * * *